United States Patent [19]

Morimoto

[11] Patent Number: 4,660,111
[45] Date of Patent: Apr. 21, 1987

[54] PAD LIFTING MECHANISM OF A FLOPPY DISK DEVICE

[76] Inventor: Shuzo Morimoto, No. 690-6, Hodokubo, Hino-shi, Japan

[21] Appl. No.: 568,796

[22] Filed: Jan. 6, 1984

[30] Foreign Application Priority Data

Jun. 10, 1983 [JP] Japan ................... 58-186034

[51] Int. Cl.[4] ............ G11B 5/012; G11B 5/016; G11B 5/54; G11B 21/22
[52] U.S. Cl. ............................. 360/99; 360/97; 360/133; 360/105
[58] Field of Search ............... 360/97, 99, 105, 106, 360/86

[56] References Cited

U.S. PATENT DOCUMENTS

| 4,024,581 | 5/1977 | Lesca et al. | 360/106 |
| 4,223,359 | 9/1980 | Galvagni | 360/86 |
| 4,315,289 | 2/1982 | Holecek et al. | 360/106 |
| 4,339,778 | 7/1982 | Wise | 360/99 |
| 4,466,033 | 8/1984 | Jordan et al. | 360/99 |
| 4,523,240 | 6/1985 | Dunstan et al. | 360/99 |

FOREIGN PATENT DOCUMENTS 2743615A 3/1979 Fed. Rep. of Germany ........ 360/97
58-94171A 6/1983 Japan ..................................... 360/97

OTHER PUBLICATIONS

IBM Technical Disclosure Bulletin, vol. 22, No. 11, Apr. 1980, pp. 5096-5098, "Disk Cartridge Player" and Interlock ... Player, both by Godsoe.
IBM Technical Disclosure Bulletin, vol. 23, No. 11, Apr. 1981, pp. 5070-5072, "Collet ... Drives" by Holecek.

Primary Examiner—John H. Wolff
Assistant Examiner—Alfonso Garcia

[57] ABSTRACT

A lifting mechanism for a floppy disc device and including a base, a carrier pivotally mounted to the base, a collet arm pivotally mounted to the carrier and having an end biased in a clockwise direction, a collet attached to the collet arm, a pad arm having an end biased in a counterclockwise direction and a pad, the pad arm engaging under pressure the collet arm, a head carriage pivotally receiving the pad arm, and components for vertically moving the collect arm engaging the pad arm in synchronism with vertical movement of the carrier.

5 Claims, 3 Drawing Figures

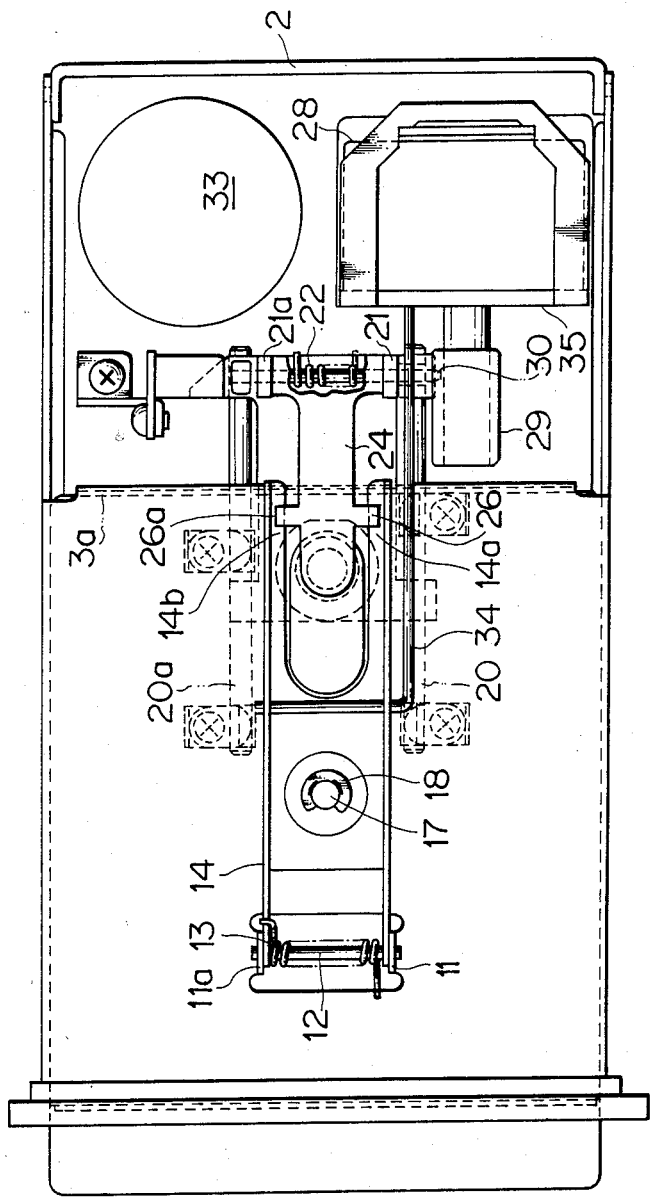
FIG_1

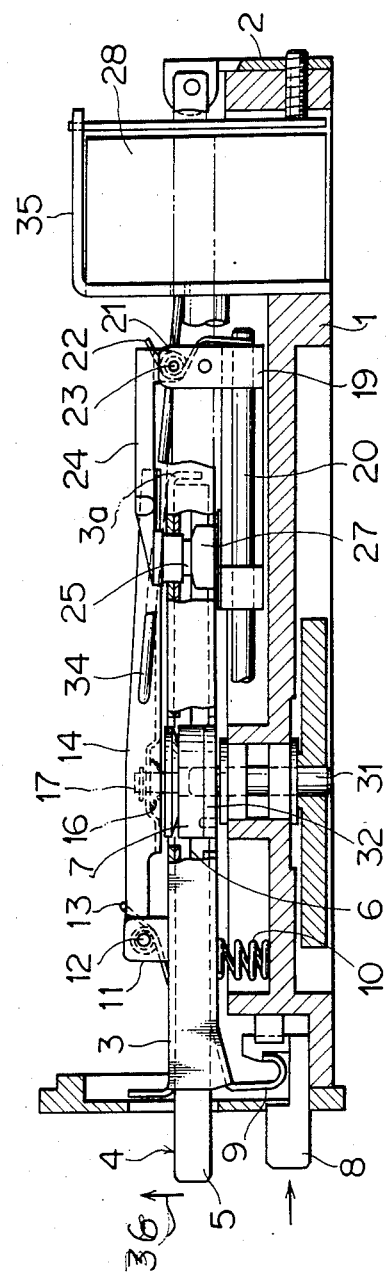
FIG_2
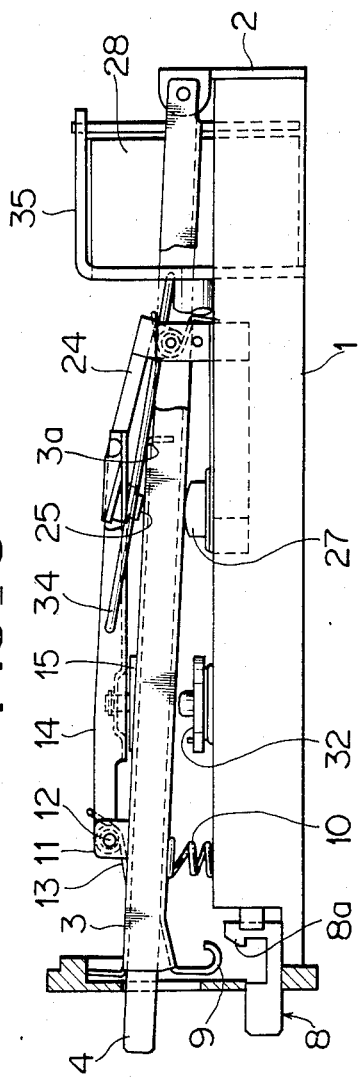
FIG_3

PAD LIFTING MECHANISM OF A FLOPPY DISK DEVICE

BACKGROUND OF THE INVENTION

The present invention relates to a floppy disc device, and more particularly to a pad lifting mechanism which serves to maintain contact between a magnetic disc and a magnetic head, and aims to provide a pad lifting mechanism of simple structure which detachably attaches a magnetic disc housed in a case to the device.

Recently, magnetic memory devices have been rapidly developed in the field belonging to information machinery such as personal computers, word processors and others, and so-called floppy disc devices have been remarkable, and make use of flexible magnetic disc as a magnetic recording medium.

The floppy disc is inserted therein with a sheet like flexible magnetic disc supported in a jacket or a case such as hard case. The magnetic disc is held at its center under a predetermined pressure by means of a drive hub and a collet, and rotates it at a high speed by a drive motor connected to the drive hub. The device presses under the predetermined pressure the magnetic head at an exposed portion of the magnetic disc by means of the pad so as to move it in the radial direction of the disc for carrying out the record and reproduction.

Since each of the magnetic disc, the magnetic head and the case is effected with pressing force, they would be scratched when the case is attached to the device. Especially when the hard case is used such occasions would be remarkable. For avoiding them, the pressing force should be removed when the case is detached or attached.

SUMMARY OF THE INVENTION

For removing the pressure, the floppy disc device is provided with a mechanism which lifts the collet and the pad. The existing device utilizes a solenoid as such a mechanism, or employs a mechanism which separately lifts the collet and the pad. These mechanisms are rather complicated in structure.

In view of the above mentioned circumstances, the present invention has been realized to develop a pad lifting mechanism which is simple and smoothly detachably attached to the magnetic disc. That is, the invention is to provide a pad lifting mechanism comprising a carrier which is pivoted to a base of the device with its one end and is attached with a magnetic disc housed in a case, a collet arm which is pivoted on an upper surface of the carrier with its one end under biasing force in the clockwise direction and is attached with a collet at its center and lower side, a pad arm which is pivoted to a head carriage with its one end under biasing force in the counterclockwise direction and engages under pressure the end portion of the collet arm at its engaging end and is provided with a pad on its front end, and a means which vertically moves the collet arm engaging the pad arm in synchronism with vertical movement of the carrier. It is therefore an object of the present invention to maintain the collet and the pad in a position completely out of the guide path of the disc carriage when the disc carriage is in the released position.

BRIEF DESCRIPTION OF THE DRAWINGS

FIG. 1 is a plan view of a floppy disc device according to the present invention;

FIG. 2 is a side cross sectional view showing the condition of record and reproduction of the device of FIG. 1; and FIG. 3 is a view of the preparation of the record and reproduction condition of the device of FIG. 1.

DETAILED DESCRIPTION OF THE PREFERRED EMBODIMENT

An explanation will be made to an outline of the present device in reference to the attached drawings. A base 1 is fixed with an attaching plate 2, and the plate 2 is pivoted with a carrier 3 thereon. The carrier 3 is attached with a cassette disc 4, and a hard case 5 of the disc 4 is housed therein with a flexible magnetic disc 6.

The carrier 3 is provided at its end part with a hook 9. When the carrier 3 is pushed down, the hook 9 is caught by a catching portion 8a of a release button 8, and the condition of record and reproduction is achieved. On the other hand, when the release button 8 is pushed, the engagement is released and the carrier 3 is moved upward by the action of a spring 10, and the preparation for the record and reproduction is achieved. Under this condition, the cassette 4 is detachably attached to the carrier 3. The carrier 3 is formed with a bending portion 3a for contacting the case 5 when the cassette disc 4 is attached.

The carrier 3 is implanted thereon with bearings 11, 11a in parallel. The bearings 11, 11a are formed with holes into which a twist spring 13 is inserted. The twist spring 13 is coiled on a collet arm shaft 12, so that a collet arm 14 pivoting on the carrier 3 is biased in a clockwise direction.

The collect arm 14 is formed with a hole at its center part, and a collet attaching arm 17 is inserted therein. The arm 14 is mounted with a stopper ring 18 at its upper projection with respect to the collet arm 14, and at its lower projection with a collet 15 via a spring 16.

A head carriage 19 is implanted with bearings 21, 21a. A twist spring 22 is inserted into bearing holes formed in the bearings 21, 21a. Spring 22 is coiled on a pad arm shaft 23 so that a pad arm 24 is biased in the counter-clockwise direction.

The pad arm 24 has a pad 25 at its end portion and lateral projections 26, 26a at its both sides. Due to the projections 26, 26a, the pad arm 24 is engaged under pressure with forked end portions 14, 14a of the collet arm 14.

The head carriage 19 has a magntic head 27 and is pivoted with the pad arm 24. The head carriage 19 is moved forward by the rotation of a step motor 28 along guide shafts 20, 20a by means of a drive mechanism, and slides in the radial direction of the magnetic disc 6 for performing the recording and reproduction of data. The above drive mechanism comprises a lead screw 29 fixed on a motor shaft of the step motor 28 and a follower 30 whose front end portion is inserted in a groove of the lead screw 29 and whose rear end portion is inserted in the head carriage 19.

The magnetic disc 6 is supported by the collet 15 and a spindle hub 32 whose spindle shaft 31 is secured on its upper portion with a center disc hub 7. The disc 6 is rotated at the high speed of the spindle shaft 31 by a drive motor 33. The disc 6 is pressed by the magnetic head 27 and the pad 25 while its record and reproduction part is in contact with its exposed portion, with the magnetic head 27 and the pad 25.

The lift lever 34 which is shaped is inserted with its end portion that is bent at a right angle into holes provided in both bent sides of the collet arm 14. The lift lever 34 has its center part in contact with the bending part 3a of the carrier 3 and has its rear part inserted into a square hole in a pulse motor attaching plate 35.

The floppy disc device of the present invention is composed as having stated above, and actuation thereof will be discussed in FIG. 2 with respect to record and reproduction. When the cassette disc 4 is attached to the carrier 3 and the latter 3 is pushed down, the hook 9 of the carrier 3 is engaged with the engaging portion 8a of the release bottom 8, and the disc hub 7 at the center of the flexible magnetic disc 6 is pushed by the collet 15 and engages the spindle 31. The flexible magnetic disc 6 contacts the magnetic head 27 at the exposed portion under pressure due to the pad 25.

When an order for the record and reproduction is given under the groove mentioned condition, the flexible magnetic disc 6 is rotated at high speed by the rotation of the spindle 31. The magnetic head 27 secured to the head carriage 19 contacts the flexible magnetic disc 6 and by the driving of the head carriage 19, by means of the step motor 28, moves it in its radial direction, and thereby making the recording and reproduction.

A further reference will be made to the preparing condition of the record and reproduction in FIG. 3. When the release button 8 is pushed at the completion of the record and reproduction, the hook 9 of the carrier 3 is released from the engaging portion 8a of the release button 8, and the carrier 3 is lifted upward along the guide path direction arrow 36 of the disc carriage 3 shown in FIG. 2, indicating the direction of the path in which the disc carriage 3 must travel in order to reach the released position depicted in FIG. 3 from the set position of FIG. 2. At this time, since the straight portion of the lift lever 34 contacts the bent part of the carrier 3 at its center part, the center part is also moved upward with the upward movement of the carrier 3. The lift lever 34 is restrained with respect to upward movement by having its rear end engaged with the pulse motor attaching plate 35 and being rotated in the clockwise direction around the fulcrum of the engaging portion of this rear end.

Since the lift lever 34 is engaged with the collet arm 14 at its end portion, the collet arm 14 is lifted upward with the movement of the lift lever 34 as mentioned above. At the same time, the pad arm 24 is also lifted upward, and the collet 15 attached to the collet arm 14 as well as the pad 25 attached to the pad arm 24 are lifted upward as shown in FIG. 3.

Attaching of the cassette disc 4 to the carrier 3 may be smoothly made without making scratches on the flexible magnetic disc 6, the magnetic head 27 or the hard case 5.

As having mentioned above, this invention is to provide a simple mechanical means which engages the collet arm for attaching the collet with the pad arm attached with the pad, and vertically moves the collet arm in accompany with vertical movement of the carrier for attaching the cassette disc. Thereby attaching of the cassette disc to the carrier may be smoothly made without making scratches on the flexible magnetic disc, the magnetic head or the hard case.

What is claimed is:

1. A lifting mechanism for a floppy disc drive device that includes a base having a fixed member, a disc carriage for supporting a cassette therein, the disc carriage having one end pivotally connected to the base and including means for containing a magnetic disc having a rotation center area, means for moving the disc carriage along a guide path between a set position adjacent to the base and a released position spaced away from the base, means for rotating the magnetic disc, means for engaging the rotation center area of the magnetic disc to the rotating means when the disc carriage is in the set position, a head carriage having a magnetic head mounted thereon, and means for moving the magnetic head radially across the magnetic disc supported in the disc carriage, the lifting mechanism comprising:

a first arm having one end pivotally connected to the disc carriage and an opposite free end and being movable toward and away from the disc carriage and spring-biased toward the disc carriage to provide a first spring action;

a collet mounted on said first arm and being movable along said guide path of said disc carriage by said first spring action of said first arm to press said rotation center area of said magnetic disc when said disc carriage is in said set position;

a second arm having one end pivotally connected to the head carriage and being movable toward and away from the head carriage and being spring-biased toward the head carriage to provide a second spring action and being engageable with said first arm by said second spring action of said second arm;

a pad mounted on said second arm and being movable along said guide path of said disc carriage to press the magnetic disc against the magnetic head when the disc carriage moves to the set position; and a lifting lever having one end operatively connected to said first arm so as to be normally pressed against said disc carriage by said first spring action of said first arm and an opposite end connected to the fixed member of the base and engaged with said first arm so as to be movable toward and away from said base, said lifting lever being movable in association with the disc carriage toward and away from said base so that in the release position of the disc carriage, said lifting lever is movable away from said base to move said first arm away from said disc carriage against said first spring action of said first arm to thereby move said collet out of said guide path of said disc carriage while said first arm moves said second arm away from said head carriage against said second spring action of said second arm to thereby move said pad away from said head carriage and out of said guide path of said disc carriage.

2. A lifting mechanism as defined in claim 1; further comprising:

means for locking said disc carriage in the set position thereof and for releasing said disc carriage; and means for biasing said disc carriage toward said released position thereof.

3. A lifting mechanism as defined in claim 2, wherein said biasing means includes a spring.

4. A lifting mechanism as defined in claim 2, wherein said locking and releasing means includes a hook attached to said disc carrier and a release button having a catching portion movable toward and away from said hook when said disc carrier is in the set position, said catching portion catching said hook when said disc carrier moves to the set position and releasing said hook when said release button is pushed, which causes said catching portion to move away from said hook so that said disc carrier is biased to said released position by said biasing means.

5. A lifting mechanism as defined in claim 1, wherein information is transferable with the magnetic disc when said disc carriage is in said set position, the cassette being movable in and out of said disc carriage across said guide path when said disc carriage is in said released position, said first arm having an abutment, said second arm engaging said first arm at said abutment, the moving means including means for driving the head carriage to thereby move the magnetic head radially across the magnetic disc.

* * * * *